United States Patent Office 3,418,094
Patented Dec. 24, 1968

3,418,094
ANTI-STATIC AGENTS FOR GLASS
FIBER MATERIALS
James G. Marsden and Samuel Sterman, Tonawanda,
N.Y., assignors to Union Carbide Corporation, a corporation of New York
No Drawing. Filed Dec. 29, 1964, Ser. No. 422,031
22 Claims. (Cl. 65—3)

ABSTRACT OF THE DISCLOSURE

A coating composition for sizing glass fibers and rendering them anti-static, comprising a film-forming binder, a glass fiber lubricant, a coupling agent for coupling the film-forming binder to the glass fibers, and an anti-static agent, the improvement in such coating compositions wherein the anti-static agent is the reaction product of a soluble salt of a transition metal and an amino-organosilicon compound selected from the group consisting of amino-organo (hydrocarbonoxy) silanes and amino-organosiloxanes, said amino-organosilicon compound having the amino groups bonded to the silicon atom through at least three successive carbon atoms of a divalent hydrocarbon chain.

---

This invention relates to coating compositions suitable for sizing glass fibers, which compositions contain an improved anti-static agent, and to glass fiber coated with such coating compositions. More particularly, these coating compositions contain, as the anti-static agent, the reaction product of a soluble metal salt of the transition metals and an amino-organosilicon compound.

Glass fibers have found considerable utility as textile fabrics and as reinforcing materials for molding and laminating resins. Glass fibers are conventionally prepared by melting glass, passing the molten glass through multiple orificed spinnerettes to form thin streams of molten glass, drawing and hardening the thin streams of glass into filaments and then gathering them into a fiber strand. Hardening is usually achieved by cooling the hot filaments in a gas stream. When the filaments emerge from the orifices of the spinnerette they are initially kept separate from each other by the cooling gas, but generally come in contact with each other at guides over which they are carried prior to or during the drawing operation. It is often desirable that the surface of the individual filaments be properly coated or sized prior to their coming into contact with each other. The sizing serves a number of functions such as improving the strength of the fibers and their wetability by resins.

When glass fiber is employed as a reinforcing material for laminating and molding resins it may be employed either in the form of a woven mat, or in the form of individually cut short lengths of fiber. Because glass fibers have the tendency of picking up static electric charges, either during formation of the fibers or during the cutting process, it is often desirable and sometimes necessary to employ an anti-static agent. Use of an anti-static agent on cut fibers enables them to be uniformly distributed throughout molding or laminating compositions. Without an adequate anti-static agent the fibers, due to the electrostatic charges on them, will repel each other causing uneven distribution of the fibers in the composition.

Sizing of glass fibers or filaments is generally accomplished by applying a coating composition to the surface of the fibers immediately after the fibers have been extruded, and before they have been cut into staple lengths. These coating compositions generally consist of (1) a film former, (2) a lubricant and (3) an anti-static agent. When the glass fibers are intended to be used in combination with a resin, the coating composition will usually also contain a coupling agent to improve the bond between the glass fibers and the resin. The particular coating composition employed with the glass fibers will be determined by the intended use of the fibers. When the glass fibers are to be used as a reinforcing agent for a resinous system, the coating composition must be one which will be compatible with the resinous system.

In addition to preventing build up of static electric charges, a successful anti-static agent must be compatible with other components of the coating or sizing composition, and in addition must not interfere with the development of good physical properties in the ultimate resinous articles which the glass fibers are intended to reinforce.

A commonly used prior art anti-static agent for glass fibers is methacrylatochromic chloride, which is generally supplied in an isopropyl alcohol solution. This anti-static agent being a chromium salt produces a green shade on the sized glass fibers which is often considered objectionable. Other prior art anti-static agents such as the cationic finishing agents have other disadvantages, such as reducing the wet strength of reinforced resinous articles made from glass fibers treated with such anti-static agents.

It is an object of this invention to provide a coating composition suitable for sizing glass fibers which contains improved anti-static agents. It is another object of this invention to provide glass fibers coated with the above improved coating compositions.

It is still another object of this invention to provide a sizing composition for glass fibers which has improved anti-static properties, which need not be a chromium containing material, thus, eliminate green coloration of the fibers to which it is applied, and which imparts better wet strength to glass fiber reinforced resinous articles than prior art materials These and other objects are achieved by the present invention which consists of a coating composition suitable for sizing glass fibers comprising (1) a film-forming binding agent (2) a glass fiber lubricant (3) a coupling agent for coupling the film-forming binding agent to the glass fibers, and (4) an anti-static agent consisting of the reaction product of (a) a soluble metal salt of a transition metal and (b) an amino-organosilicon compound. Improved glass fibers and glass fiber reinforced resinous articles are obtained by coating glass fibers with the above coating composition.

The improved anti-static agents employed in the present invention are reaction products of an amino-organosilicon compound and a soluble metal salt. While not wishing to be limited by any theory, it is believed that in some instances the reaction products are metal salt complexes containing a coordinate covalent bond between the nitrogen atom of the amino-organosilicon compound and the metal cation of the metal salt. Formation of a metal salt complex, however, cannot be confirmed in every instance. It is believed that in some cases only a simple association or reaction product may be formed.

The amino-organosilicon compounds suitable for use in preparing the anti-static agents of the present- invention include amino-organo(hydrocarbonoxy)silanes and amino-organo-siloxanes having a primary, a secondary or tertiary amino group bonded to a silicon atom through at least three successive carbon atoms of a divalent hydrocarbon chain.

The amino-organo(hydrocarbonoxy)silanes which are useful in the present invention include those represented by the structural formula:

(A) 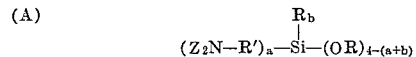

where Z is selected from the group consisting of a hydrogen atom, a monovalent hydrocarbon group, an amino substituted hydrocarbon group, a hydroxy substituted hydrocarbon group, and a hydrocarbonoxy substituted hydrocarbon group, R' is a divalent hydrocarbon group containing at least three carbon atoms, R is a monovalent hydrocarbon group, $a$ has a value of from 1 to 3 inclusive, $b$ has a value of from 0 to 2 inclusive, and the sum of $(a+b)$ has a value of from 1 to 3 inclusive.

The amino-organosiloxanes which are useful in the present invention include those composed essentially of units having the repeating formula:

(B) 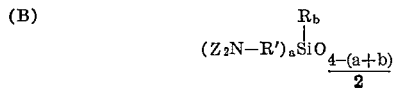

wherein Z, R', R, $a$, $b$, and $(a+b)$ are the same as defined above.

Amino-organosiloxanes that are useful in the present invention also include copolymers of units represented by Formula B above with units represented by Formula C below wherein the copolymer may contain from 0.1 to 99.9 mole percent of groups represented by Formula B and from 0.1 to 99.9 mole percent of groups represented by Formula C. Formula C may be represented as:

(C) 

where R is the same as defined above, and $c$ has a value of from 0 to 3 inclusive.

Preferably the copolymeric siloxanes are composed of from 25 to 99.9 mole percent of groups represented by Formula B and from 0.1 to 75 mole percent of groups represented by Formula C. Preferably, the amino-organosiloxanes have an organic group to silicon atom ratio of from 0.5:1 to 2.8:1, and even more preferably a ratio of from 0.9:1 to 2.5:1. In copolymeric siloxanes the relative arrangement of the different types of siloxane groups with respect to each other is not critical. Thus, the various groups can be arranged in alternating sequence, randomly or in blocks. These siloxanes can be linear, cyclic or cross-linked in structure, and contain a total of at least 2 and up to 1000 or more siloxane units represented by Formulas B and C above.

Illustrative of the monovalent hydrocarbon groups represented by R and Z in Formulas A, B and C above are linear alkyl groups, for example, the methyl, ethyl, propyl, butyl and octadecyl groups; cyclic alkyl groups, for example, the cyclohexyl and cyclopentyl groups; linear alkenyl groups, for example, the vinyl and the butenyl groups; cyclic alkenyl groups, for example, the cyclopentenyl and cyclohexenyl groups; aryl groups, for example, the phenyl and naphthyl groups; alkaryl groups, for example, the tolyl and xylyl groups; and aralkyl groups, for example, the benzyl and beta-phenylethyl groups.

Illustrative of the amino-substituted monovalent hydrocarbon groups represented by Z in Formulas A and B above are the amino-alkyl groups, which constitute a preferred embodiment of the Z group such as the gamma-aminopropyl, delta-aminobutyl, gamma-aminoisobutyl and epsilon-aminophentyl groups, and the N-hydrocarbon-aminoalkyl groups such as the N-methyl-gamma-aminopropyl group and the N,N-diphenyl-delta-aminobutyl groups, and aminoalkyl substituted aminoalkyl groups such as the N-beta-aminoethyl-gamma-aminopropyl group. Illustrative of the hydroxy-substituted monovalent hydrocarbon groups represented by Z in Formulas A and B above are the hydroxyalkyl groups such as the beta-hydroxyethyl and the beta-hydroxypropyl groups. Illustrative of the alkoxy-substituted monovalent hydrocarbon groups represented by Z in Formulas A and B above are the gamma-methoxypropyl and the gamma-ethoxypropyl groups.

Illustrative of the divalent hydrocarbon group represented by R' in Formulas A and B above are linear alkylene groups, for example, the trimethylene $—(CH_2)_3—$ and the octadecamethylene $—(CH_2)_{18}—$ groups; arylene groups, for example, the naphthylene $—C_{10}H_6—$ and the para-phenylene $—C_6H_4—$ groups; cyclic alkylene groups, for example, the cyclohexylene $—C_6H_{10}—$ group; alkarylene groups, for example, the tolylene

group; and aralkylene groups, for example, the $$—CH_2(C_6H_5)CHCH_2CH_2—$$

group. Preferably R' is an alkylene group having 3 to 5 carbon atoms.

Ilustrative of specific amino-organo(hydrocarbonoxy) silanes represented by Formula A are gamma-aminopropyl - triethoxysilane, gamma - aminopropyl(methyl) diethoxylsilane, gamma - aminopropyldimethyl(ethoxy) silane, delta-aminobutyltriethoxy-silane, delta-aminobutyl (methyl)diethoxysilane, delta - amino - butyldimethyl (ethoxy)silane, N-methyl-gamma-aminoisobutyltriethoxysilane, epsilonaminopentyltriethoxysilane, ortho-aminophenylmethyltripropoxysilane, para-aminophenyldiphenyl-(phenoxy) silane, N-beta-aminoethyl-gamma-aminopropyltriethoxysilane, i.e. $H_2NCH_2CH_2NH(CH_2)_3Si(OC_2H_5)_3$, and N-gamma-amino-propyl-gamma - aminopropyltriethoxysilane, i.e. $H_2N(CH_2)_3N(CH_2)_3Si(OC_2H_5)_3$.

Illustrative of specific units represented by Formula B are the gamma-aminopropylsiloxy, gamma-aminopropyl (methyl)siloxy, i.e. $H_2N(CH_2)_3Si(CH_3)O$, gamma-aminopropyl dimethylsiloxy, delta - aminobutyldimethylsiloxy, delta-amino-butyl(methyl)siloxy, delta-aminobutyldimethylsiloxy, N-methyl-gamma-aminoisobutylsiloxy, epsilon-aminopentylsiloxy, para - aminophenylmethylsiloxy, i.e. $H_2NC_6H_4CH_2SiO_{1.5}$, para-aminophenyldiphenylsiloxy, N-beta-amino-ethyl-gamma-aminopropylsiloxy, i.e.

$$H_2NCH_2CH_2NH(CH_2)_3SiO_{1.5}$$

and N-gamma-aminopropyl - gamma - aminopropylsiloxy. i.e. $H_2N(CH_2)_3NH(CH_2)_3SiO_{1.5}$ units.

Illustrative of specific units represented by Formula C are the —O—Si—O—, methylsiloxy, dimethylsiloxy, trimethylsiloxy, vinylsiloxy, amylsiloxy, diphenylsiloxy, methyldiphenylsiloxy, vinyl(ethyl)siloxy, i.e.

$$CH_2=CHSi(C_2H_5)O$$

and beta-phenylethyl(methyl)siloxy, i.e.

$$C_6H_5CH_2CH_2Si(CH_3)O$$

units.

The silicon atom in each unit represented by Formulas B and C above is bonded through at least one oxygen atom to at least one other silicon atom. It is to be understood that in addition to the substituents indicated in these formulas, isolated silicon atoms with unsatisfied valence bonds may be bonded to H, OH or OR groups without altering the basic nature of the siloxane.

Optionally, a silane having the formula:

(D) $$R_dSi(OR)_{4-d}$$

where R is the same as defined above and $d$ has a value of 0 to 3 inclusive, can be present in admixture with the silanes represented by Formula A above in the coating compositions of this invention. Illustrative of the silanes represented by Formula D are methyltriethoxysilane, dimethyldiethoxysilane, trimethylethoxysilane, vinyltriethoxysilane, benzyltripropoxysilane, phenyl(methyl)dipropoxysilane, phenyltriethoxysilane and diphenyldiethoxysilane.

The preferred amino-organo(hydrocarbonoxy)silanes for the preparation of the anti-static agents of the present invention are those silanes with the scope of Formula A which are depicted by the formula:

(E) 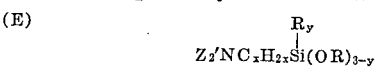

where Z' is hydrogen or an aminoalkyl group (e.g. beta-aminoethyl, gamma-aminopropyl or delta-aminobutyl), R is the same as defined above, x has a value of at least 3 (and preferably has a value from 3 to 5 inclusive) and y has a value of from 0 to 2 inclusive.

A preferred class of amino-organosiloxanes for the preparation of the anti-static agents of the present invention are those within the scope of Formula B which are depicted by the formula:

(F)
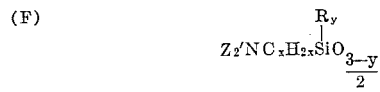

where Z', R, x and y are the same as defined above.

Another preferred class of amino-organosilicon compounds which are suitable for the preparation of the antistatic agents of the present invention are the reaction products of the above-described amino-organo(hydrocarbonoxy)silanes or amino-organosiloxanes, represented by Formulas A, B and C above, which have primary or secondary amino groups, and epoxy compounds. Such reaction products which may be referred to as epoxy amino silicone reaction products and their method of preparation are more particularly described in our copending application Ser. No. 180,009, filed Mar. 15, 1962, the disclosure of which is hereby incorporated by reference.

The anti-static agents, i.e. the amino-organosilicon metal salt reaction products may contain from .04 to about 4 parts by weight of metal salt per part by weight of the amino-organosilicon compound. Preferably, these reaction products contain from .04 to 0.8 parts by weight of metal salt per part by weight of amino-organosilicon compound. These reaction products are prepared simply by mixing the metal salt with the amino-organosilicon compound. The reaction, which is preferably carried out in the presence of a solvent such as water or an alcohol, is substantially instantaneous.

The metal salts which are employed in the formation of the anti-static agents of the present invention are the soluble salts of the transition metals. These metals include aluminum, calcium, titanium, vanadium, chromium, manganese, iron, cobalt, nickel, copper, zinc, strontium, yttrium, zirconium, niobium, molybdenum, ruthenium, rhodium, palladium, silver, cadmium, barium, hafnium, tantalum, tungsten, rhenium, osmium, iridium, platinum, gold and mercury. The preferred metals are aluminum, chromium, iron, cobalt, nickel, copper, zinc and zirconium. Preferred anions are those which produce water soluble salts, since the binder compositions containing the anti-static agent are preferably prepared as aqueous solutions or emulsions. However, if an organic solvent or emulsifier is employed, then salts soluble in that solvent are useful. Metal chlorides are the most preferred metal salts.

The following examples illustrate several methods of preparing the anti-static agents for use in the coating compositions of the present invention.

EXAMPLE I

A 22 liter, 3-neck, round-bottom flask which was fitted with a mechanical stirrer and a thermometer was charged with 7590.4 grams of distilled water and 5329.6 grams of $CrCl_3 \cdot 6H_2O$. This mixture was stirred until all of the $CrCl_3 \cdot 6H_2O$ was dissolved. Then 4420 grams of $$NH_2(CH_2)_3Si(OCH_2CH_3)_3$$

was added over a 45 minute period with constant stirring. The temperature of the reaction mixture rose from 25° C. to 63° C. during the addition of the $$NH_2(CH_2)_3Si(OCH_2CH_3)_3$$

The resulting product was a clear, deep green, solution of partially hydrolyzed 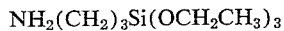

EXAMPLE II

A 2-liter, 3-neck, round-bottom flask which was fitted with a mechanical stirrer, a thermometer, and a reflux condenser was charged with 446 grams of

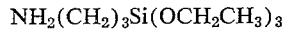

54 grams of distilled water were added, and the mixture was refluxed while stirring for 2½ hours. The resulting clear and colorless solution was diluted with 750 grams of distilled water, and the diluted solution was stirred for an additional 30 minutes. 69.5 grams of $ZnCl_2$ in 430.5 grams of distilled water was slowly added, and the entire mixture was heated at reflux for one hour. The reaction mixture was cooled to room temperature and diluted further with 250 grams of distilled water. The final product was a clear, colorless, solution of partially hydrolyzed $ZnCl_2 \cdot 4NH_2(CH_2)_3Si(OCH_2CH_3)_3$.

EXAMPLE III

A 3-liter, 3-neck flask which was fitted with a mechanical stirrer, thermometer, and dropping funnel was charged with 668 grams of $NH_2(CH_2)_3Si(OCH_2CH_3)_3$. 1125 grams of distilled water were added with stirring, and then an 18% by weight HCl solution was added slowly with stirring until the pH of the solution reached 6.5 (550 grams of the HCl solution were required). The $$HCl \cdot H_2N(CH_2)_3Si(OCH_2CH_3)_3$$

solution was transferred to a 5-liter, three-neck flask, and 410.7 grams of $ZnCl_2$ in 804 grams of water were added slowly with stirring. A clear, colorless solution of partially hydrolyzed 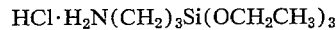 was obtained.

The amount of anti-static agent used in the coating compositions of this invention may range from about 0.5 to about 60 parts by weight per 100 parts by weight of the film-forming binding agent present in the coating composition. Preferably, the anti-static agent is employed in an amount of from about 1 to 10 parts by weight per 100 parts by weight of the film-forming binder.

The film-forming binding agents suitable for use in coating compositions of this invention include naturally occurring materials, for example, starches, such as corn starch, potato starch, tapioca starch and sago flour; gums, such as gum arabic, gum tragacanth and gum karaya; glues, such as gelatin and animal glues; casein; glucose; cellulosic materials such as carboxymethyl cellulose, hydroxyethyl celulose, methyl cellulose; oxyethylated stearates; and synthetic resins, such as urea-formaldehyde polymers, melamineformaldehyde polymers, acetone-formaldehyde polymers, phenol-formaldehyde polymers; alkyd resins such as glyceryl-phthalic anhydride reaction products; polyamides, saturated and unsaturated polyesters, hydrocarbon siloxane resins, epoxy resins; vinyl resins such as homopolymers and copolymers of ethylene, propylene, styrene, isobutylene, butadiene, acrylonitrile, vinyl chloride, vinyl pyrrolidone, vinylidene chloride, vinyl acetate, vinyl alcohol acrylic acid and ester thereof, methacrylic acid and esters thereof, and the like. Mixtures of these film-forming binders may also be employed. These film-forming binders are preferably used in the form of aqueous solutions or emulsions.

Glass fiber lubricants useful in the above-described coating compositions are well known in the art, and include animal as well as marine oils, fats and waxes such as carnuba oil and candalia wax; petroleum hydrocarbon oils and waxes; silicone oils, such as linear dihydrocarbon-polysiloxanes; glycerine; polyethylene glycols; polyhydric alcohol esters such as esters of diethylene and tetraethylene glycol; fatty alcohols, such as lauryl and stearyl alcohol; fatty acid amides, such as pelargonamide, anhydrous acid solubilized polyunsaturated fatty acid amides, and the like. The amount of lubricant used in the coating composition may range from about 5 to 50 parts by weight of lubricant per 100 parts by weight of the film-forming binder in the coating composition. Preferably, the lubricant is present in an amount ranging from about 10 to 30 parts by weight per 100 parts by weight of the film-forming binder. The lubricants are preferably employed as aqueous solutions or emulsions.

The coupling agents useful in the above-described coating compositions are known in the art. They include reactive organosilicon compounds containing organic groups bonded to silicon atoms which contain variant functionality suitable for reaction with particular classes of resins. Illustrative coupling agents are silanes such as vinyltriethoxysilane, vinyltriacetoxysilane, allyltrichlorosilane, aminosilanes, epoxysilanes, gamma-methacryloxypropyltrimethyloxysilane, and the like; and siloxanes such as vinylpolysiloxane, allylpolysiloxane, and the like. The amount of coupling agent used in the coating composition may range from about 2 to 150 parts by weight of coupling agent per 100 parts by weight of the film-forming binder. Preferably, the coupling agent is present in an amount of from about 5 to about 50 parts by weight per 100 parts by weight of the film-forming binder. The coupling agents are generally used in an undiluted form, but they may also be used in the form of solutions or emulsions as is well known in the art.

The order in which the components of the coating compositions of the present invention are mixed is not critical.

Although water or an inert organic solvent is not an essential component of the present coating compositions, it is often desirable to incorporate such a solvent into the coating compositions. The solvent may be incorporated either during the initial preparation of the coating composition (either as a separate component, or as a solvent for one or the other components of the composition) or the coating composition may be prepared as a concentrate and diluted before being used. The solvent may be present in an amount ranging from about 2,000 to 15,000 parts by weight of solvent per 100 parts by weight of the film-forming binder. Preferably, from about 3,000 to 10,000 parts by weight of solvent per 100 parts of film-forming binder is used.

The remaining examples are given for the purpose of illustrating the coating compositions of the present invention:

EXAMPLE IV

Glass fibers issuing from a spinnerette were coated with coating compositions in accordance with methods known in the art. Two lots of glass fibers were coated. The first lot was coated with an aqueous solution of a prior art coating composition which contained the following ingredients (all percentages are based on the total weight of the aqueous solution) 2.14 per cent polyvinylacetate in the form of an aqueous emulsion containing 50–55 weight percent solids as the film-forming binder, 0.28 percent anhydrous acid solubilized polyunsaturated fatty acid amide (AHCO 220 sold by Arnold Hoffman Co.) as the lubricant, 0.175 percent gamma-methacryloxypropyltrimethoxysilane as coupling agent, and 0.16 percent methacrylatochromyl chloride (containing 0.048 weight percent chromium) in the form of an isopropyl alcohol solution containing 6.0 weight percent chromium metal as the anti-static agent.

The second lot of glass fibers was treated with a coating composition which was the same as that used for the first lot except that it contained 0.048 weight per cent chomium in the form of an aqueous solution of $NH_2(CH_2)_3Si(OC_3H_5)_3 \cdot CrCl_3$ as the anti-static agent instead of the previously used methacrylatochromylchloride. Both lots of coated glass fibers were then cured for 5½ hours at 235° F., converted to four end-roving and stored for 24 hours at 50 percent relative humidity at 70° F. The effectiveness of the particular antistatic agents was determined as follows: The four end-roving was passed through a small cutter and the effluent stream of cut glass fibers was directed against a polished metal plate. This was continued for 15 seconds with each separate lot of coated glass fibers. At the end of this time, the relative magnitude and polarity of the static electrical charge which had built up on the plate was measured. The nearer the reading is to zero, irrespective of the polarity of the charge, the more effective is the anti-static agent. The results of the two lots described above are shown in Table I below:

TABLE I

| Lot: | Static charge |
| --- | --- |
| First lot (prior art) | −10.0 |
| Second lot (invention) | +1.0 |

This data demonstrates that the anti-static agent of the present invention is far superior to the prior art anti-static agent in its ability to reduce the accumulation of static electrical charges when used on an equal contained-metal basis.

EXAMPLE V

Two coating compositions labeled A and B in Table II below, were prepared in order to compare the bonding strength between coated glass fibers and a typical laminating resin. The bonding strength was determined by measuring the flexural strength of laminates having glass fibers coated with a composition differing only with respect to the anti-static agent used. Each coating composition contained:

(1) 2.14% polyvinyl acetate (an aqueous emulsion containing 50–55 weight percent solids) as the film-forming binder (2) 0.28% anhydrous acid solubilized polyunsaturated fatty acid amide as lubricant (3) 0.175% gamma-methacryloxypropyltrimethoxysilane as coupling agent, and (4) Varying amounts of different anti-static agents, each in an amount sufficient to provide 0.048 weight percent of the metal.

All of the above percentages are by weight and based on the total weight of the coating composition. The remainder of the coating composition is water. These coating compositions were used to coat style 181–112 glass cloth, which is a satin weave cloth having the following characteristics: a thickness of 10 mils, weighing about 8.9 ounces per square yard, 57 x 54 ends and picks per square inch, and a breaking strength of 375 x 350 pounds per square inch. The weaving size was burned off and the cloth cleaned prior to use. Strips of this cloth 7 inches wide were cut. Each strip was passed through a different coating composition, air dried and then heated at 135° C. for 2.5 minutes to cure the coating composition. The cloth strip was then cut into 7 inch squares. The coated glass cloth squares were then used to prepare laminates of glass-cloth reinforced unsaturated polyester resin. The resin used was Paraplex P–43 a reaction product of maleic anhydride and ethylene glycol. The resin was prepared for the lamination by first mixing 270 grams of it with 30 grams of styrene to lower the viscosity of the resin. One percent by weight (based on the resin) of benzoyl peroxide, a curing catalyst was then added to the resin. Each laminate was prepared in the following manner: A sheet of flexible film, such as cellulose acetate approximately six times the size of the laminate to be prepared was placed on a table and one ply of the coated 7 inch square glass cloth was placed on it. A portion of the catalyzed resin was evenly poured on the cloth. Then another ply of the coated glass cloth was placed on the resin and additional resin poured on the cloth. This procedure was continued until 12 plies of cloth had been added. The excess flexible film was then wrapped over the wet stacked laminate in such manner as to enclose it and seal it. Air was removed from the laminate by gently rolling it with a rolling pin. A conventional press was preheated to 145° F. and fitted with stops approximately ⅛ inch thick. The wet laminate was placed in the press and cured for one hour at 145° F. and 15 p.s.i.g. and then for another hour at 250° F. and 15 p.s.i.g. pressure. After the press had cooled the laminate was removed. Upon removal from the press, the flexible film covering was removed and test specimens 4″ x ½″ were cut from the laminate. A portion of the specimens from each laminate were reversed as dry specimens and another portion were immersed for eight hours in boiling tap water prior to testing. The flexural strengths of the laminates were measured substantially as described in Air Force Specification MILP–8013 (also Federal Specification LP–406a Method No. 1031). A specimen was placed on standardized supports, two inches apart, and the specimen then broken by a load applied midway between these two supports. The resulting values for several specimens were then averaged to get representative flexural strengths for dry wet laminates. Table II below shows the results of these tests as well as the specific anti-static agent used in the glass fiber coating composition.

TABLE II

| Sample | Anti-static agent | Flexural strength, p.s.i. | |
|---|---|---|---|
| | | Dry | 8 hr. boil |
| A | HCL.$H_2N(CH_2)_3Si(OC_2H_5)_3$.$ZnCl_2$ | 72,300 | 64,500 |
| B | Methacrylatochromic chloride (prior art material). | 75,800 | 54,600 |

The above data shows that the anti-static agent of the present invention (Sample A) provides bonding between glass fibers and the laminating resin whose strength though slightly less (by about 4.6%) when dry, is superior (by about 8.2% to the prior art in wet strength.

EXAMPLE VI

Four coating compositions were prepared in order to further test the bonding strength between laminating resins and glass fiber coated with compositions of this invention. Each composition, labeled C through F in Table III below, was prepared in the same manner as Compositions A and B in Example V with the exception that varying amounts of different anti-static agents were used. The amounts (shown as percent metal based on the weight of the coating composition) and specific anti-static agents used are shown in Table III, along with the flexural strength obtained on the test samples. Each of the test laminates C through F was prepared and tested in exactly the same way as Samples A and B in Example V. Each of coating compositions C through F had good anti-static properties.

TABLE III

| Sample | Anti-static agent | Percent metal in composition | Flexural strength, p.s.i. | |
|---|---|---|---|---|
| | | | Dry | 8 hr. boil |
| C | $NH_2(CH_2)_3Si(OC_2H_5)_3$.$CrCl_3$ | 0.024 | 73,300 | 66,500 |
| D | $NH_2(CH_2)_3Si(OC_2H_5)_3$.$FeCl_3$ | 0.024 | 73,500 | 64,400 |
| E | $NH_2(CH_2)_3Si(OC_2H_5)_3$.$AlCl_3$ | 0.016 | 75,100 | 46,700 |
| F | $NH_2(CH_2)_3Si(OC_2H_5)_3$.$ZrOCL_2$ | 0.024 | 70,800 | 64,200 |

The results in Table III demonstrate that composite articles made from glass fibers which have been sized with anti-static coating compositions of this invention possess good bonding between the laminating resin and the glass fibers as evidenced by the good flexural strengths of the laminated samples C through F.

Although the examples above employed specific film-forming binders, lubricants, coupling agents and amino-organo-silicon-metal anti-static agents in the coating compositions, it should be understood that a wide variety of equivalent materials disclosed herein may be used in their place.

Glass fibers coated with the improved coating compositions of the present invention may be used in all conventional glass fiber applications such as textiles, reinforcing materials for thermoplastic and thermosetting resins, and the like.

What is claimed is:
1. In coating compositions for sizing glass fibers and rendering them anti-static, comprising a film-forming binder, a glass fiber lubricant, a coupling agent for coupling the film-forming binder to the glass fibers, and an anti-static agent, the improvement in such coating compositions wherein the anti-static agent is the product of the reaction in water of a soluble salt of a transition metal and an amino-organosilicon compound selected from the group consisting of amino-organo (hydrocarbonoxy) silanes and amino-organosiloxanes, said amino-organosilicon compound having the amino groups bonded to the silicon atom through at least three successive carbon atoms of a divalent hydrocarbon chain.

2. The composition of claim 1 wherein the amino-organosilicon compound is an amino-organo(hydrocarbonoxy)-silane and represented by the structural formula:

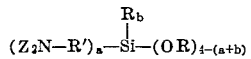

$$(Z_2N-R')_a-\underset{\underset{R_b}{|}}{Si}-(OR)_{4-(a+b)}$$

where Z is selected from the group consisting of a hydrogen atom, a monovalent hydrocarbon group, an amino substituted hydrocarbon group, a hydroxy substituted hydrocarbon group, and a hydrocarbonoxy substituted hydrocarbon group, R' is a divalent hydrocarbon group containing at least three carbon atoms, R is a monovalent hydrocarbon group, $a$ has a value of from 1 to 3 inclusive, $b$ has a value of from 0 to 2 inclusive, and the sum of $(a+b)$ has a value of from 1 to 3 inclusive, all numbers being whole numbers.

3. The composition of claim 1 wherein the amino-organosilicon compound is an amino-organosiloxane selected from the group consisting of
(1) amino-organosiloxanes having the formula:

(I)
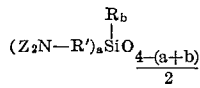

$$(Z_2N-R')_a\underset{\underset{R_b}{|}}{Si}O_{\frac{4-(a+b)}{2}}$$

where Z is selected from the group consisting of a hydrogen atom, a monovalent hydrocarbon group, an amino substituted hydrocarbon group, a hydroxy substituted hydrocarbon group, and a hydrocarbonoxy substituted hydrocarbon group, R' is a divalent hydrocarbon group, R is a monovalent hydrocarbon group, $a$ has a value of from 1 to 3 inclusive, $b$ has a value of from 0 to 2 inclusive, and the sum of $(a+b)$ has a value of from 1 to 3 inclusive, and (2) copolymers of units represented by Formula I with units represented by Formula II wherein said copolymer may contain from 0.1 to 99.9 mole percent of groups represented by Formula I and from 0.1 to 99.9 mole percent of groups represented by Formula II, wherein the unit represented by II is:

(II)

$$R_cSiO_{\frac{4-c}{2}}$$

where R is a monovalent hydrocarbon group, and $c$ has a value of from 0 to 3 inclusive.

4. The composition of claim 2 wherein the amino-organo(hydrocarbonoxy)silane has the formula:

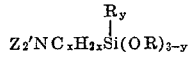

$$Z_2'NC_xH_{2x}\underset{\underset{R_y}{|}}{Si}(OR)_{3-y}$$

where Z' is selected from the group consisting of a hydrogen atom and an aminoalkyl group, R is a monovalent hydrocarbon group, $x$ has a value of from 3 to 5 inclusive and $y$ has a value of from 0 to 2 inclusive.

5. The composition of claim 3 wherein the amino-organosiloxane is represented by the formula:

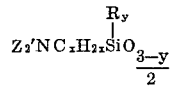

$$Z_2'NC_xH_{2x}\underset{\underset{R_y}{|}}{Si}O_{\frac{3-y}{2}}$$

where Z' is selected from the group consisting of a hydrogen atom and an aminoalkyl group, R is a monovalent hydrocarbon group, $x$ has a value of from 3 to 5 inclusive and $y$ has a value of from 0 to 2 inclusive.

6. The composition of claim 1 wherein the metal salts are selected from the group consisting of the water soluble salts of aluminum, chromium, iron, cobalt, nickel, copper, zinc and zirconium.

7. The composition of claim 1 wherein the metal salts are the metal chlorides of the metals selected from the group consisting of aluminum, chromium, iron, cobalt nickel, copper, zinc and zirconium.

8. The composition of claim 1 wherein the anti-static agent contains from 0.4 to 4 parts by weight of metal salt per one part by weight of the amino-organosilicon compound.

9. The composition of claim 1 wherein the anti-static agent is present in the coating composition in an amount ranging from about 0.5 to about 60 parts by weight of anti-static agent per 100 parts by weight of the film-forming binder.

10. The composition of claim 1 wherein the film-forming binder is a synthetic resin.

11. The composition of claim 1 which in addition contains an inert solvent.

12. The composition of claim 11 wherein the inert solvent is water.

13. The composition of claim 1 wherein the anti-static agent is an aqueous solution of the compound represented by the formula:

$$NH_2(CH_2)_3Si(OC_2H_5)_3 \cdot CrCl_3$$

14. The composition of claim 1 wherein the anti-static agent is an aqueous solution of the compound represented by the formula:

$$NH_2(CH_2)_3Si(OC_2H_5)_3 \cdot FeCl_3$$

15. The composition of claim 1 wherein the anti-static agent is an aqueous solution of the compound represented by the formula:

$$NH_2(CH_2)_3Si(OC_2H_5)_3 \cdot AlCl_3$$

16. The composition of claim 1 wherein the anti-static agent is an aqueous solution of the compound represented by the formula:

$$NH_2(CH_2)_3Si(OC_2H_5)_3 \cdot ZrOCl_2$$

17. The composition of claim 1 wherein the anti-static agent is an aqueous solution of the compound represented by the formula:

$$HCl \cdot H_2N(CH_2)_3Si(OC_2H_5)_3 \cdot ZnCl_2$$

18. In a process for manufacturing glass fibers comprising the steps of passing molten glass through a spinnerette to form thin streams of molten glass, and drawing and hardening the thin streams of glass into filaments, the improvement which comprises coating said glass filaments prior to the time they come into contact with each other with the coating composition of claim 1.

19. In a process for manufacturing glass fibers comprising the steps of passing glass through a spinnerette to form thin streams of molten glass, drawing and hardening the thin streams of glass into filaments, gathering them into a fiber strand, and then cutting said fiber strand into short lengths, the improvement which comprises coating said fiber strand prior to the time it is cut into short lengths with the coating composition of claim 1.

20. Glass fibers coated with the composition of claim 1.
21. Glass fibers coated with the composition of claim 2.
22. Glass fibers coated with the composition of claim 3.

References Cited
UNITED STATES PATENTS

| | | | |
|---|---|---|---|
| 2,957,839 | 10/1960 | Johnson et al. | 260—29.2 |
| 2,894,967 | 7/1959 | Gilkey | 260—448.2 |
| 3,098,833 | 7/1963 | Solomon | 260—29.2 |
| 3,168,389 | 2/1965 | Eilerman | 260—448.2 |
| 3,227,579 | 1/1960 | Bluestein | 260—448.2 |

ALLAN LIEBERMAN, *Primary Examiner.*

J. E. CALLAGHAN, *Assistant Examiner.*

U.S. Cl. X.R.

65—11; 260—29.2, 37